Aug. 29, 1961 W. E. BRANDT 2,997,814
MACHINE FOR PRECISION FINISHING OF PARTS
BY CONTROLLED VIBRATION
Filed April 23, 1958 10 Sheets-Sheet 1

INVENTOR
William E. Brandt
BY
John B. Brady
ATTORNEY

United States Patent Office 2,997,814
Patented Aug. 29, 1961

2,997,814
MACHINE FOR PRECISION FINISHING OF PARTS BY CONTROLLED VIBRATION
William E. Brandt, Red Lion, Pa., assignor, by mesne assignments, to Bell Intercontinental Corporation, a corporation of Delaware
Filed Apr. 23, 1958, Ser. No. 730,387
17 Claims. (Cl. 51—7)

My invention relates broadly to an improved construction of vibratory machine and more particularly to a precision mechanism for producing controlled vibration capable of finishing large parts of very substantial weights as well as extremely small and delicate pieces of infinite sizes contours and descriptions.

One of the objects of my invention is to provide a construction of vibratory machine employing a load-receiving bowl supported at the bottom thereof and confined on its sides in such manner that the vibratory movement of the bowl may be controlled with high precision.

Another object of my invention is to provide a construction of vibratory machine for the precision finishing, degreasing, cleaning, desealing, deburring, grinding, deflashing, or stock removal, radius formation, fine finishing, coloring, lustering and/or burnishing of parts by controlled vibration which is self-cooling in its operation and wherein the frictional heat built up within the container during the vibratory action of the parts therein is substantially dissipated through pumping action in an airflow system associated with the vibratory bowl.

Another object of my invention is to provide an improved suspension for the bowl of a vibratory machine by which the movement of the bowl may be controlled to produce efficient vibratory action upon the contents of the bowl by restricting horizontal movement of said bowl at points along the sides thereof, supplying bottom spring suspension for the bowl and by supplying motion to the bowl through a rotating shaft eccentrically machined or carrying eccentric weights and located beneath the bowl or container whereby the path of travel of both the upper and lower portions of the bowl trace a substantially rotary motion inducing the desired vibration in the parts within the bowl.

Another object of my invention is to provide an improved suspension for the bowl of a vibratory machine by which the movement of the bowl may be controlled to produce efficient vibratory action upon the contents of the bowl through a coil and leaf spring suspension of the bowl in a cradle, which suspension holds the bowl in an upright position but allows the contents or load in the bowl to move in a substantially rotating motion under control of eccentric weights associated with a rotating shaft rotatively mounted beneath the bowl whereby the rotary path of travel of the bowl induces the desired vibra- in the load within the bowl, where the load may consist of media, compound plus water and work-pieces or one or more of these.

Still another object of my invention is to provide a system for suspending the bowl of a vibratory machine in a manner by which eccentric weights carried by a drive shaft rotatively secured to the base of the bowl may be rotationally driven for subjecting the bowl and its contents to vibration, while the top and bottom portions of the bowl through the throwing action of the eccentric weights trace a rotative path of movement for imparting predetermined vibratory motion to contents of the bowl.

A further object of my invention is to provide a construction of vibratory bowl machine in which noise and transmitted vibration are reduced to a minimum and substantially subdued and absorbed within the spring suspension system and flexible shaft coupling connection of the machine.

Other and further objects of my invention reside in the assembly of a vibratory bowl machine which is reliable and predictable in operation with a high degree of precision as set forth more fully in the specification hereinafter following by reference to the accompanying drawings in which:

FIG. 9 is a fragmentary cross-sectional view taken substantially along line 9—9 of FIG. 2;

My invention is directed to a construction of improved vibrating machine for precision finishing, degreasing, cleaning, descaling, deburring, deflashing, grinding or stock removal, radius forming, fine finishing, coloring, lustering, and/or burnishing of parts of the type set forth in my copending application Serial No. 641,399, filed February 20, 1957, for Method and Apparatus for Precision Finishing of Parts and Objects by Controlled Vibration. After extended research and development, I have improved the structure of my earlier invention by providing more precise control for the gyratory path of the bowl of the vibrating machine. In the improved machine of this invention the bowl is provided with bearings in which are rotatively mounted a shaft containing eccentrically driven weights or an eccentrically machined shaft which is rotatively driven from an external source for imparting vibration to the bowl and wherein the bowl is suspended in a cradle through leaf spring and coil spring arrangements in which the leaf springs are connected to opposite ends of the bowl while the coil springs are symmetrically positioned adjacent and beneath the sides of the bowl intermediate the ends of said bowl for governing the vibratory path of movement of the bowl. A composite vibratory movement is imparted to the bowl so that the bottom and top portions of the bowl substantially rotate in the vertical plane in a circular path of travel. The resulting motion of the bowl causes the objects and the finishing or grinding media and/or compounds in the bowl to rotate and vibrate. The relative motion between the media, compound (plus water in wet processing) and workpieces contained in the bowl produces the proper abrasive, polishing and/or burnishing action to obtain the desired results. In certain instances it is also possible to process workpieces without benefit of media. Since the entire mass in the bowl is vibrating and the various constituents of the mass are in constant relative motion to each other the abrasive or processing action is obtained throughout the entire mass and is not merely on the top and/or bottom portion thereof. While the "scrubbing" action here described is the most effective portion of the action, the substantially rotary path followed by the mass as such and caused by the amplitude and frequency range of vibration employed is important from the standpoint of obtaining absolute uniformity of results on all workpieces processed without benefit of fixtures. In addition to the improved controlled path of movement obtained for the bowl and the contents thereof by the instant invention, in cases where a cover is necessary for processing I provide means for cooling the contents of the bowl so that the mass in the vibrating container builds up frictional heat, this heat is substantially dissipated by perforated or slotted ducts in the cover of the bowl constructed to control pumping action of the airflow while returning liquid particles to the bowl or container, or is substantially dissipated by an opening in the cover of said bowl sufficiently large to admit an adequate quantity of cooling air into said bowl in which the opening is so shielded that operating personnel will not be splashed: according to need, other types of cover, described elsewhere in this application, may be used. The parts within the bowl may thus be maintained at a moderate and safe temperature while subjecting the parts to a deburring, abrasive, grinding, polishing and/or burnishing operation. By these terms I include but do not restrict to all precision finishing operations, such as cleaning, degreasing, descaling, radii formation, stock removal, fine finishing, coloring, lustering, and/or burnishing of metal, metal alloys, or plastic objects by controlled vibration either under conditions of a wet or dry process, with or without the benefit of liquids.

A drainage arrangement is located in the vicinity of the bottom curvature of the bowl or container, to which arrangement a flexible hose or valve may be connected. Such flexible hose or valve connection may be used for draining liquid compounds or waste materials or waste materials suspended in liquid, such as very fine particles of abrasive media breakdown, or rinse water, etc. at the end of or during a particular processing cycle.

Figure 8:
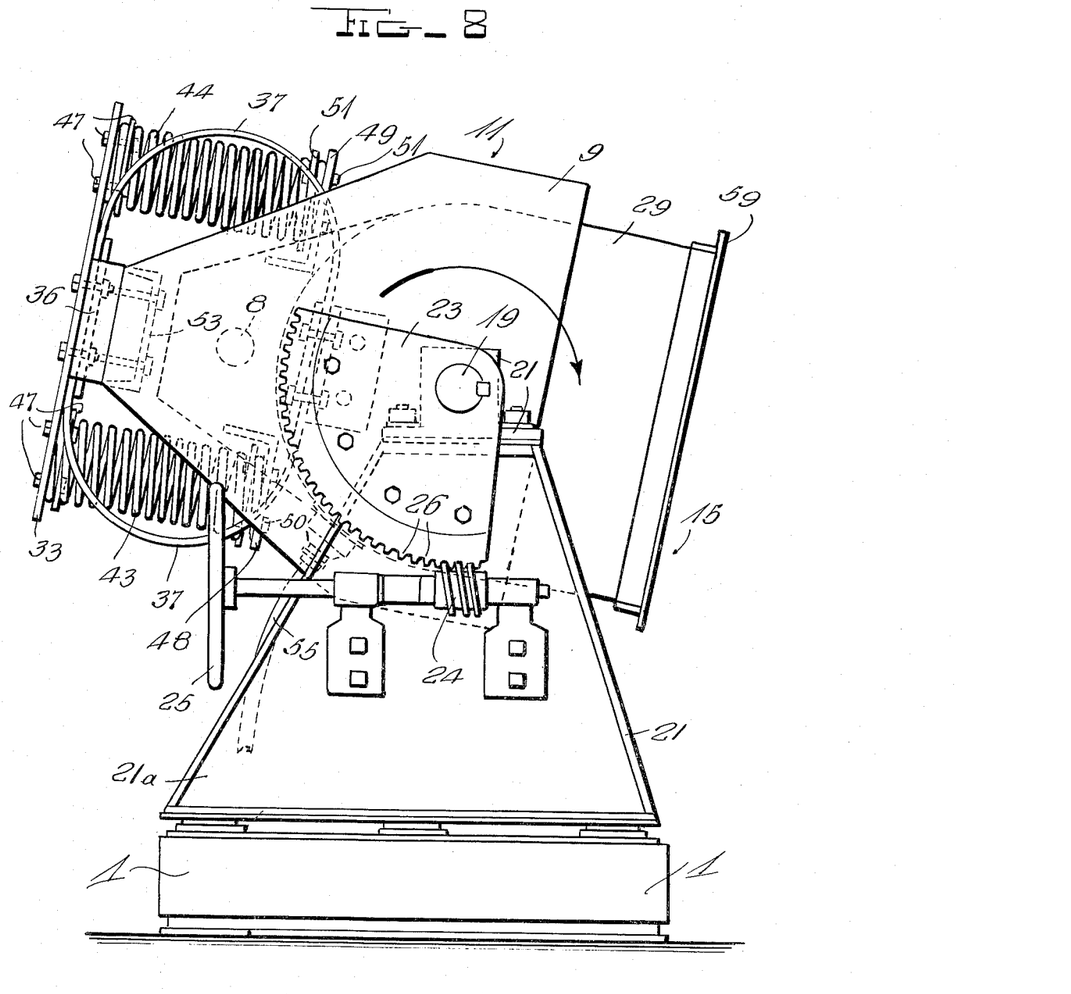
FIG. 8 is an end elevational view of the vibratory machine in the dumping position as seen from the same end as shown in FIG. 4.

Referring to the drawings, in more detail, reference character 1 designates the base structure of the vibratory machine on which there is mounted at one end the driving motor support 2, on which the motor 3 is mounted for driving shaft 4 which carries the drive pulley 5 driving the belt 6, which operates over driven pulley 7 carried by stub shaft 8' which is rotatively mounted to extension 27 of cradle 11 by bearings 28. The shaft 8 extending longitudinally beneath the bowl of the machine and is journaled in the opposite ends 29 and 30 of the bowl 15 and is connected to and driven by stub shaft 8' through flexible coupling 8". The shaft 8 carries eccentric portions or weights thereon intermediate the journaled ends thereof as shown at 12 and 14 which are either integral with the shaft or attached thereto for imparting a vibratory action to shaft 8 and thus to bowl 15 through bowl bearings 16 and 17 in which shaft 8 is journaled. Vibratory action produced in shaft 8 is substantially absorbed by flexible coupling 8" so that no substantail amount of vibratory action is transferred to shaft 8' or cradle 11 and the greater majority of the vibratory action is confined to bowl 15. The bowl 15 extends vertically through the cradle frame formed by cradle end members 9 and 10 connected by longitudinal side frame members 18. Outwardly projecting trunnions 19 and 20 are carried by cradle end members 9 and 10 respectively and are journaled in upright standards 21 and 22 carried by the base structure 1. Standards 21 and 22 are reinforced by end plates 21a and 22a, respectively. The trunnion 19 projects from one end thereof beyond its journal bearing in standard 21 and is connected to the arcuate gear 23, which is engaged by the worm gear 24 rotatively mounted to standard reinforcing end plate 21a, which is adjustable under control of hand wheel 25 to move the cradle 11, carrying with it bowl 15, to a charging or discharging position as shown in FIG. 8. Hand wheel 25 is revolved to move worm gear 42 in the arcuate rack teeth 26, of the arcuate gear 23, enabling the cradle 11 and thus the bowl 15 to be moved to charging or discharging position since gear 23 is connected to a trunnion carried by the cradle and the trunnions are free to rotate in the supporting standards on which they are journaled.

Figures 1, 10, 11:
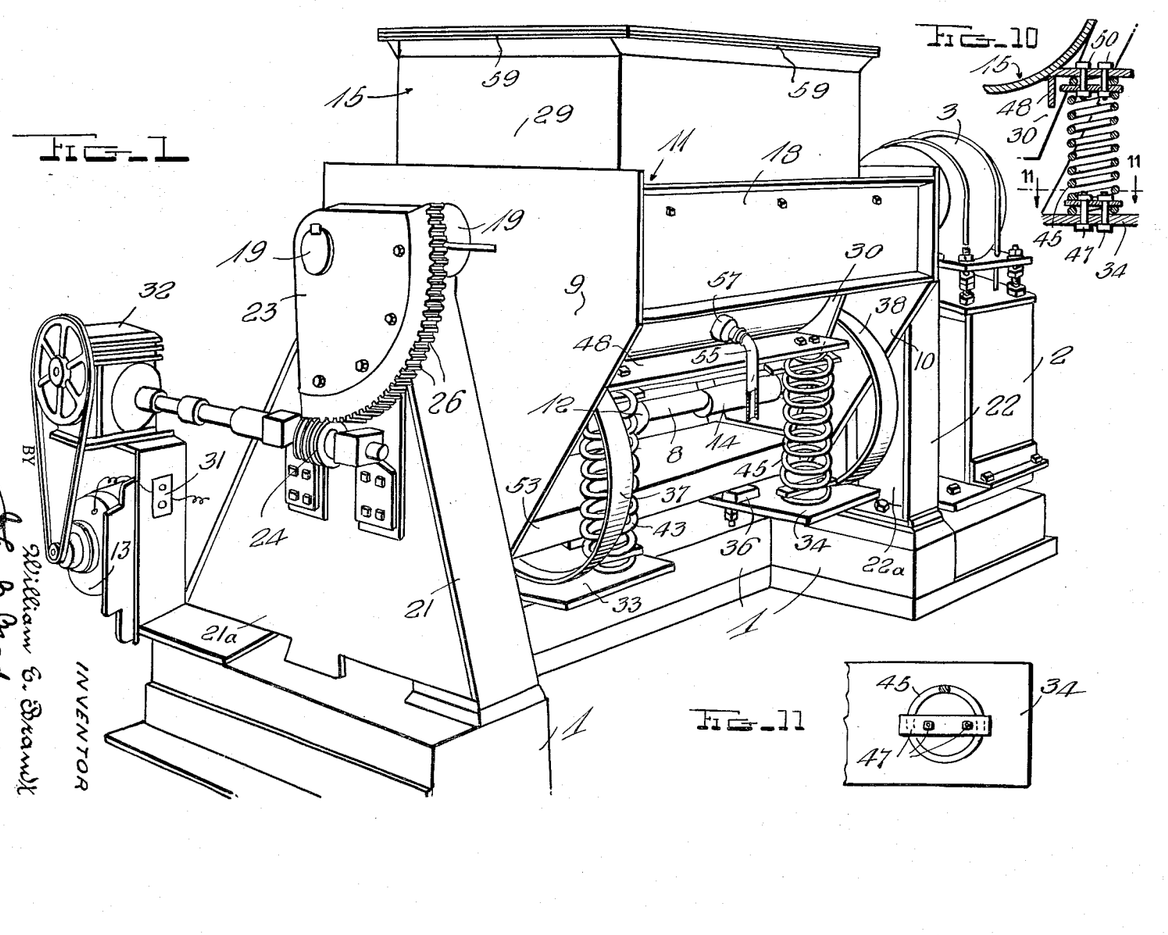
FIGURE 1 is a perspective view of the vibrating machine of my invention and showing particularly the dumping mechanism under control of a motor rather than a manual hand wheel.
FIG. 10 is a fragmentary cross-sectional view taken substantially along line 10—10 of FIG. 2 showing particularly the mounting construction of one of the coil springs.
FIG. 11 is a horizontal section view taken substantially along line 11—11 of FIG. 10.
Figure 2:
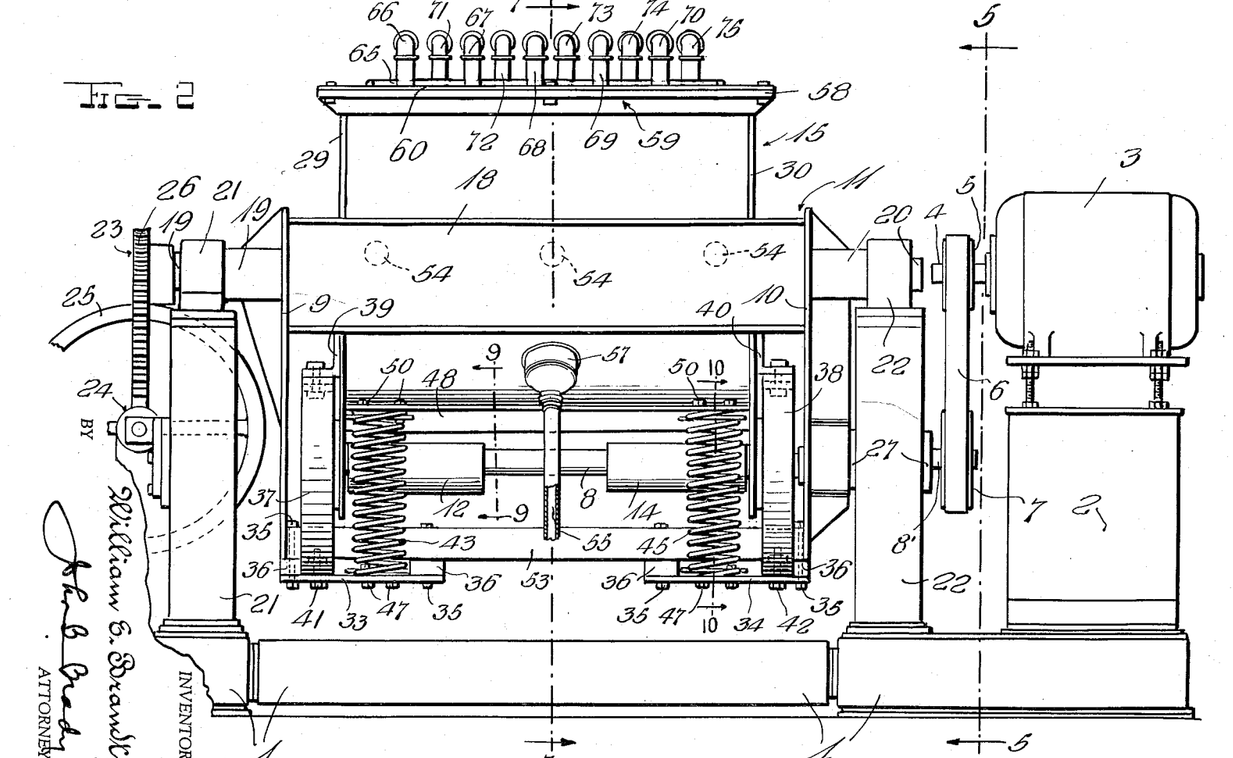
FIG. 2 is an elevational view looking at the vibrating machine from the side toward which the bowl tilts to the dump position.
Figures 2, 3:
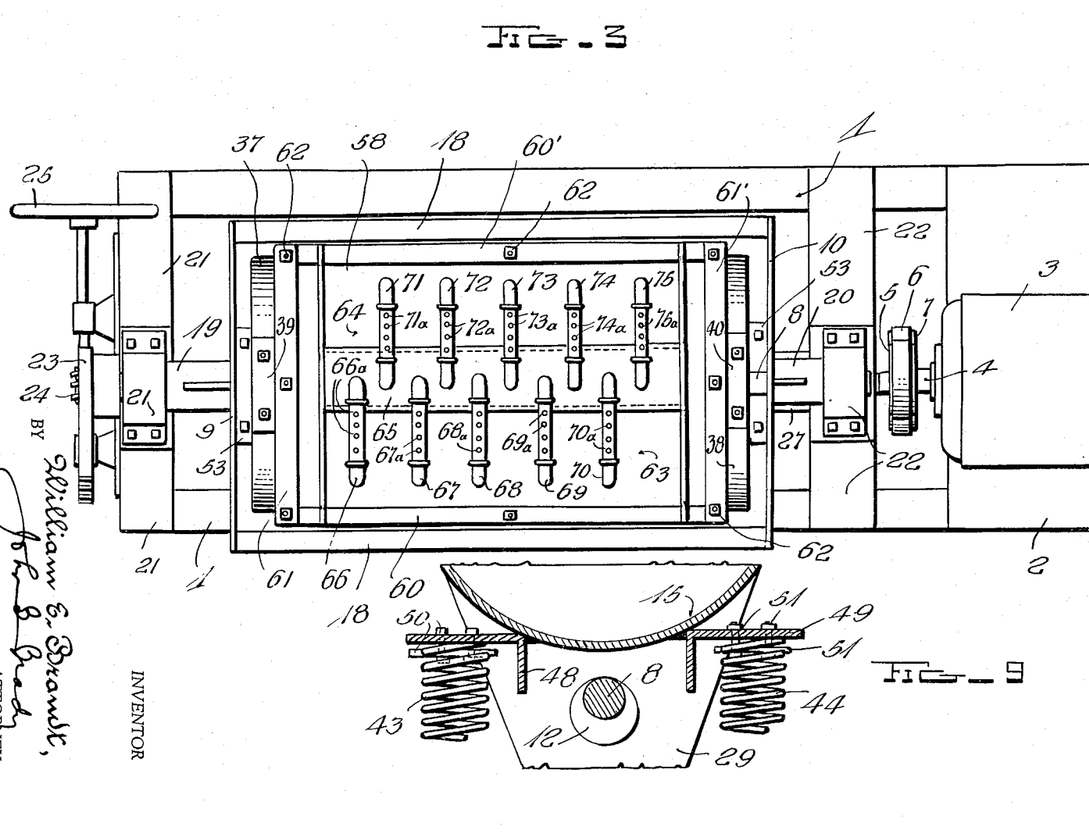
FIG. 3 is a top plan view of the vibrating machine of my invention and showing particularly the arrangement of the ducts on the cooling cover.

Worm gear 24 may be controlled by an electric motor and gear reducer arrangement as shown in FIG. 1 instead of the manual hand wheel 25. In this instance motor 13, whose direction of rotation is controlled by switch 31, drives gear reducer 32, the output thereof being connected to worm gear 24.

The bottom portion of cradle 11 is reinforced by channel member 53 extending between cradle end plates 9 and 10 below the position of shaft 8 beneath the bottom of bowl 15. At opposite ends of channel member 53 spring mounting plate members 33 and 34 are bolted at 35 normal to but spaced from the horizontal plane, of channel member 53 by spacer members 36. Each spring mounting plate carries a pair of coil springs and one or more leaf springs. While the drawing shows but one leaf spring, one or more such leaf springs may be used. Leaf springs 37 and 38 are connected between spring mounting plates 33 and 34 of cradle 11 and opposite ends 29 and 30 respectively of bowl 15. The leaf springs 37 and 38 are mounted to ends 29 and 30 of bowl 15 by leaf spring mounting assemblies 39 and 40 at a position above bearings 16 and 17 such that the respective mounting assemblies lie between the interior surface of the cradle end walls and the ends of bowl 15. The leaf springs are connected to spring mounting plates 33 and 34 as shown at 41 and 42 at a position exterior the ends of bowl 15 but interior the ends of cradle 11.

Coil spring pairs 43 and 44, 45 and 46, are respectively connected to spring mounting plates 33 and 34 as shown at 47 at positions intermediate the bowl end plates 29 and 30 and symmetrically arranged on opposite sides of the bowl 15. Brackets 48 and 49 extend longitudinally along the sides of bowl 15 in the vicinity of the bottom thereof between bowl and plates 29 and 30 and provide a mounting surface connected to the bowl for connecting the coil springs thereto. Coil springs 43 and 45 are connected to opposite ends of bracket 48 as shown at 50 while coil springs 44 and 46 are connected to opposite ends of bracket 49 as shown at 51.

From the preceding it can be seen that bowl 15 is supported, suspended, and stabilized in cradle 11 only by the leaf spring and coil spring arrangements connected between the lower portions of the bowl and the bottom of the cradle. With this spring-suspension arrangement of the bowl and the flexible coupling 8'' there is no appreciable transmitted vibration, therefore ideally confining substantially all of the vibratory motion to the bowl 15, and the noise level is also very substantially reduced.

The upper and lower limits of movement of the bowl and also the side limits of movement, since the path of travel is substantially circular, depend upon the driven speed of shaft 8, the size and weight of the eccentric portions 12 and 14 of the shaft and the resiliency of the leaf springs and coil springs. The greater the speed at which shaft 8 is driven, the further off-center the longitudinal axis of shaft 8 will be thrown from the position of the longitudinal axis of shaft 8 when in a state of rest because of the off-center weights formed on the shaft by the eccentrics. Thus when shaft 8 is driven the longitudinal axis thereof will trace a circular path about the position of the longitudinal axis when shaft 8 is "at rest" and the radius of the circular path thus traced is dependent upon the factors previously mentioned. The flexible coupling 8'' is the member which permits shaft 8 to deviate from its aligned position with stub shaft 8'. Since shaft 8 is journaled in bearings on bowl 15 the circular path traced by the shaft is also imparted to the bowl.

The bottom shaft 8 runs true and may be either directly connected to the motor 3 or other prime mover through a flexible coupling such as shown at 8' or is connected to the motor or prime mover through the flexible coupling and belt or chain drive 6 as illustrated. The belt or chain drive permits speed changes by a change of pulleys or sprockets. Variable speed prime movers could also be employed. In operation when the main shaft 8 is driven the eccentric portions 12 and 14 of the main shaft 8 impart a composite vibratory motion to the bowl which causes the bottom and top portions of the bowl 15 to trace a substantially rotative path in the vertical plane, in a circular path of travel within the limits of the stationary cradle 11. The resulting motion of the bowl 15 causes the objects within the bowl and the finishing or grinding media and/or compounds in the bowl to follow a rotative path and vibrate. The relative motion between the objects and the finishing media produces the proper abrasive scrubbing, cleaning, grinding, or burnishing action to obtain the desired results. Since the entire mass in the bowl is vibrating, the abrasive or processing action is obtained throughout the entire mass and not merely on the top and/or bottom surface.

The driving motor 3 or prime mover is provided with a reversing switch which enables the operator to reverse the motion in the bowl from one direction to the opposite direction. This is a desired and necessary feature when it comes to precision finishing large fixtured pieces which require this reverse motion at half cycle for absolute uniformity.

Bumpers or rollers 54 are provided on the interior surface of side frame members 18 to prevent the side of the bowl 15 from hitting or rubbing against said frame members during operation or in various positions of tilt while dumping the load. Thus the bumpers or rollers, constructed of a resilient material, confine the sides of the bowl within the cradle and restrict excessive horizontal movement of the bowl to maintain the motion in the top portion of the bowl substantially the same as that in the bottom portion of the bowl.

Figure 4:
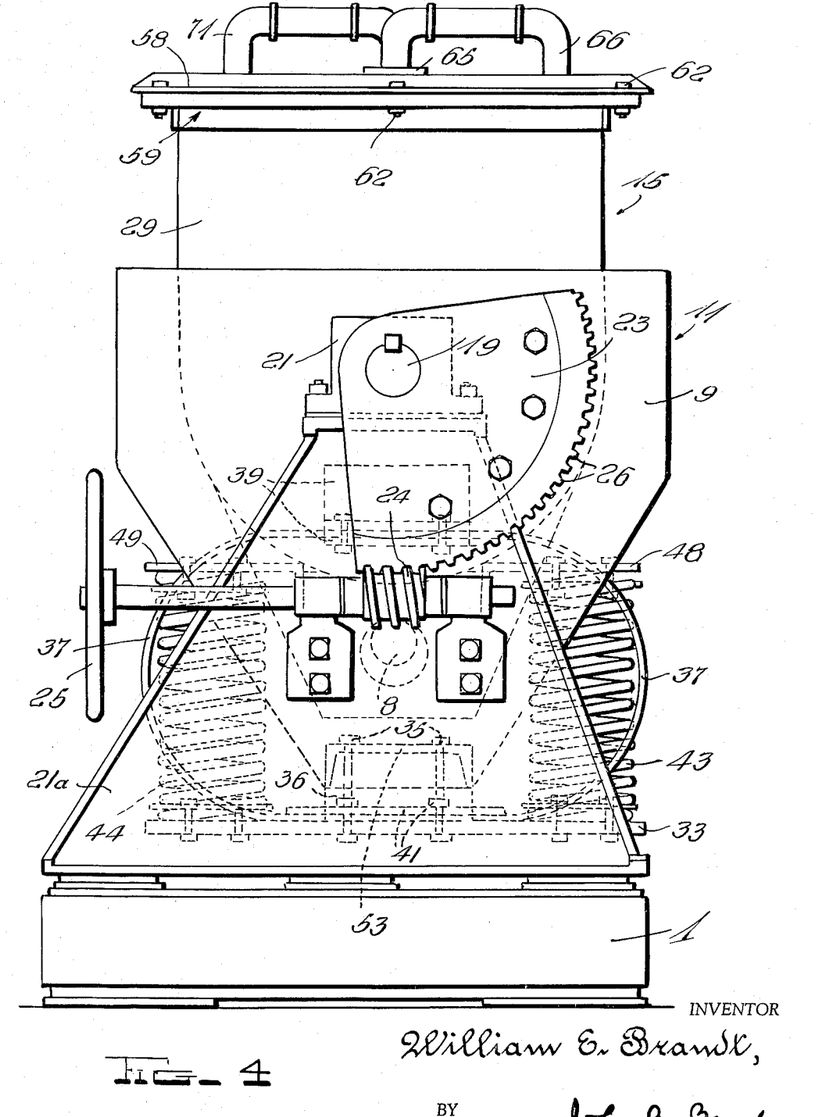
FIG. 4 is an end elevational view of the vibratory machine looking at the end carrying the dumping mechanism.
Figure 5:
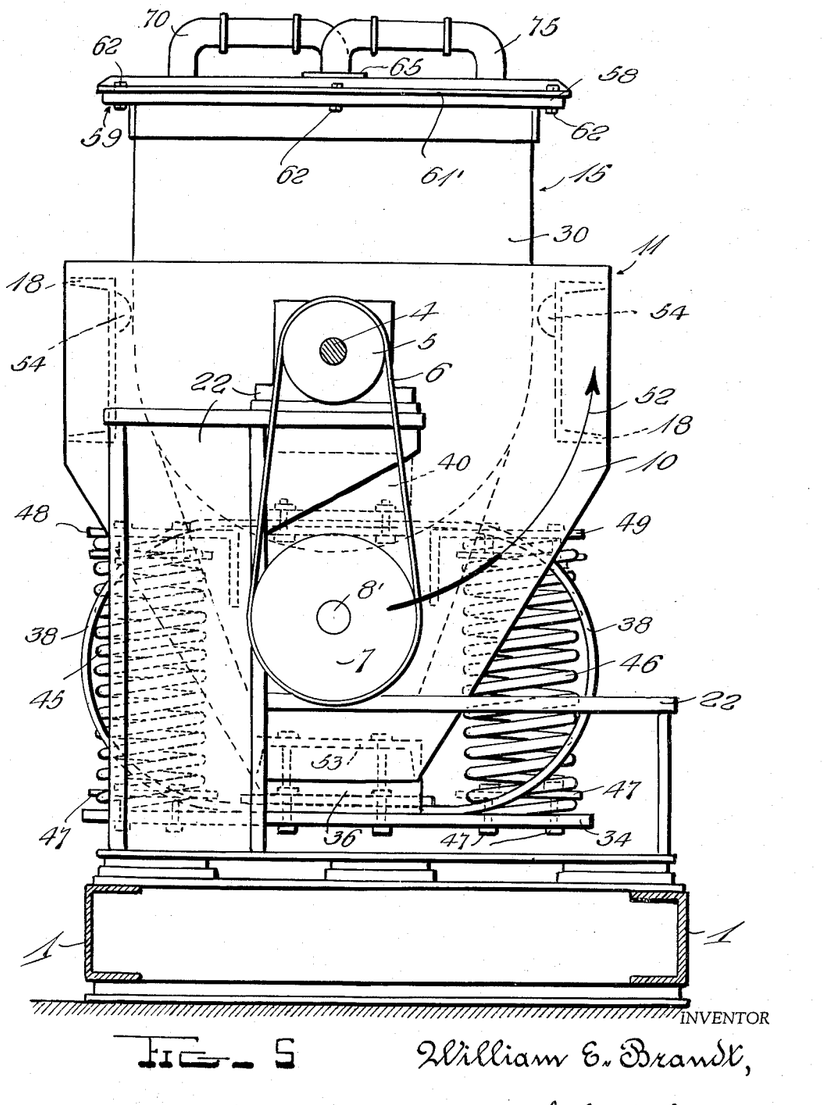
FIG. 5 is an end elevational view partly in section of the vibratory machine taken substantially along line 5—5 of FIG. 2.
Figure 6:
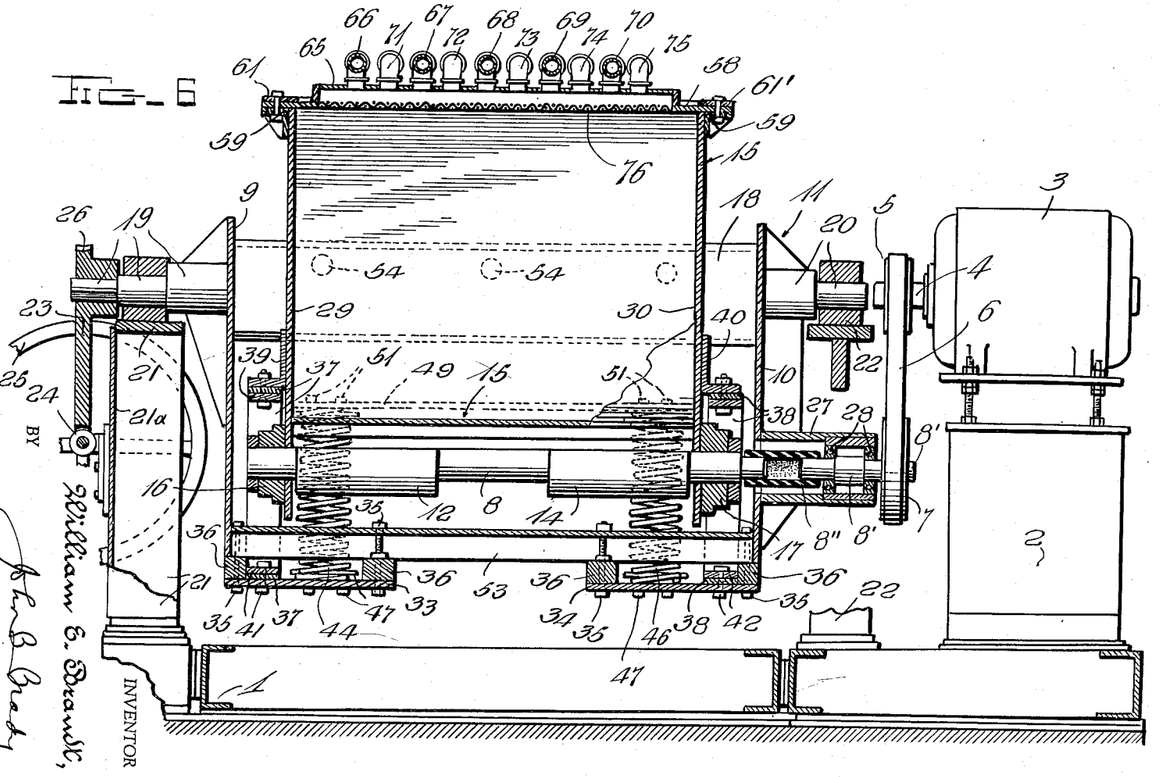
FIG. 6 is a longitudinal vertical sectional view taken substantially along the center line of the vibratory machine and showing particularly the mounting of the end leaf springs and the longitudinally mounted eccentrically machined shaft or shaft carrying the eccentric weights.
Figure 7:
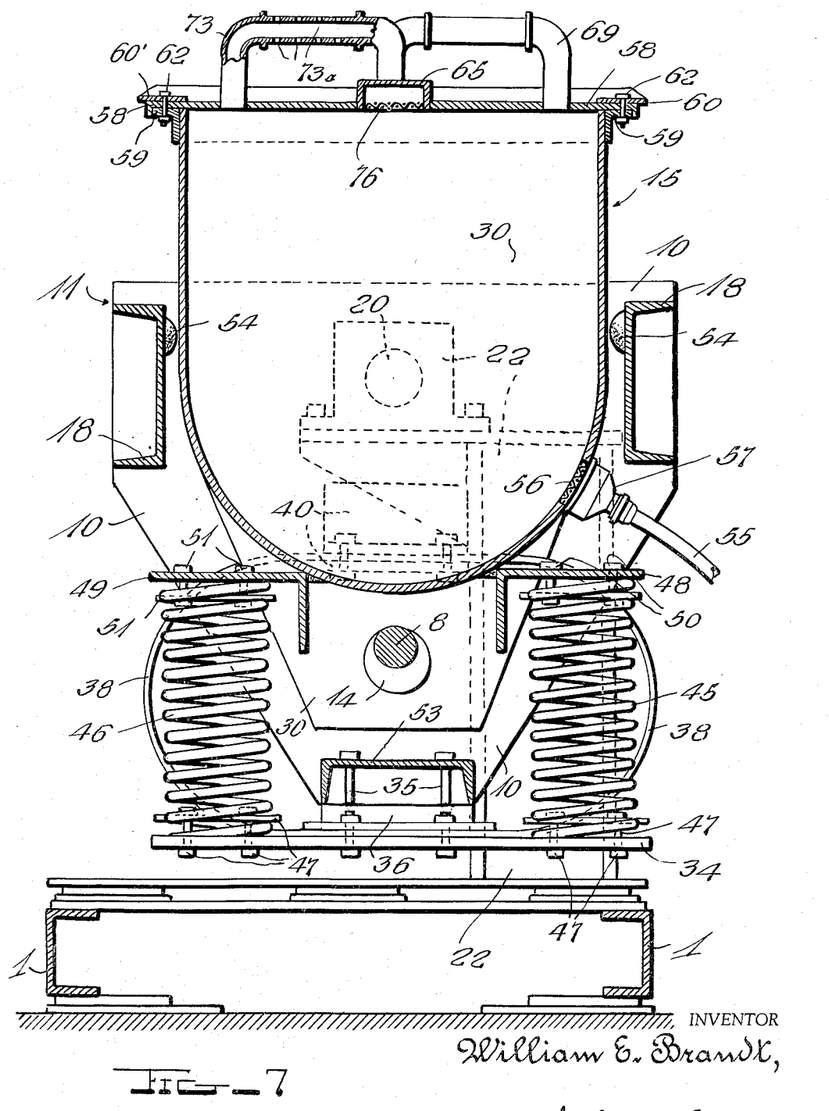
FIG. 7 is a transverse sectional view taken substantially along line 7—7 of FIG. 2 and showing particularly the connection of the drain hose to the bottom curvature of the bowl.

The bowl or container 15 is rectangular in shape with a semi-cylindrical bottom and with vertical or inclined sides longitudinally traversed by spring mounting brackets and flat or dished ends with the parts fastened together to form an integral member. The bowl ends extend down below the cylindrical portion of the bottom and are fitted with bearings as shown at 16 and 17 for shaft 8 below the cylindrical portion of the bottom of the bowl. The shaft 8 fitted with fixed or variable eccentrics indicated generally at 12 and 14 is arranged to fit in the above mentioned bearings with the eccentrics disposed intermediate thereof. The fact that the cradle is pivotally mounted in standards 21 and 22 by means of trunnions 19 and 20 forming part of the cradle enables the bowl to be readily oriented for charging or discharging as heretofore explained. To enable extension 27 of cradle 11 to move backwards in an arc indicated by arrow 52 in FIG. 5, while stub shaft 8' is connected to belt drive 6, the standard 22 is constructed as shown in FIG. 5 with all supporting beams on the side toward which the bowl dumps, thus allowing extension 27 with shaft extensions of shaft 8 enclosed to be oriented into the dumping position shown in FIG. 8 from the position shown in FIGS. 4 and 5.

In the vicinity of the bottom curvature of the bowl, or container, that is, at some point along the cylindrical bottom portion of said bowl I provide a connection for a flexible hose 55 or drain valve. The hose connection consists of a screen 56 and a goose neck or elbow fitting 57 connected to the bowl to permit the passage of liquid waste materials or waste materials suspended in liquid or rinse water, such as previously described, between the bowl and the flexible hose. Since the hose 55 is flexible, there is no interference from it with the vibratory motion of the bowl when in operation. As a matter of fact, the drainage arrangement may be put to use while the machine is in motion, without stoppage of processing. The hose may be connected through a valve arrangement to output or waste disposal pipes. The presence of this drainage arrangement is of considerable practical value since it makes possible rinsing of the load and/or changing of compound without stopping the machine, thus facilitating automation of the unit.

In order that the work load of the bowl or container may be maintained as cool as possible during those processing runs which necessitate a complete cover, I provide a special arrangement of cover for the bowl. The mass in the vibrating container during some operations may build up an undesirable degree of frictional heat. I have found that it is possible to dissipate this heat by the arrangement of perforated or slotted ducts associated with the cover 58 shown in FIGS. 2, 3, 4, 5, 6 and 7 adapted to fit over the flange 59 of the bowl 15 and to be secured thereto. Any suitable means of fastening cover 58 to the peripheral flange 59 on the top of the bowl may be employed. I have shown beads 60 and 60' at each side of the cover 58 and beads 61 and 61' at either end thereof adapted to be fastened to the upper flange 59 of the bowl 15 by appropriate bolts indicated at 62. Clamps or other suitable fastening means could also be employed. The cover 58 supports two sets of substantially U-shaped ducts or pump tubes represented at 63 and 64. A manifold 65 extends longitudinally of the cover 58 and forms a central connection for the two sets of ducts 63 and 64. The set of ducts 63 consists of U-shaped pipes 66, 67, 68, 69, and 70 each of which contain perforations, slots or holes 66a, 67a, 68a, 69a, and 70a. The set of ducts 64 are also constituted by pipes 71, 72, 73, 74 and 75 which are alternated in position between the pipes 66, 67, 68, 69 and 70 of the set of ducts 63 as shown. Pipes 71, 72, 73, 74 and 75 have perforations 71a, 72a, 73a, 74a, and 75a therein. The inner ends of the sets of ducts 63 and 64 terminate in the manifold 65 directed into the bowl 15. The inside of the manifold 65 is covered by perforated metal screening 76. The frictional heat built up within the vibrating mass in the container formed by the bowl 15 is substantially dissipated through these ducts by reason of the pumping action of the air flow through the ducts while returning liquid particles to the bowl or container. One set of ducts functions upon vibratory movement of the bowl in one direction while the other set of ducts functions upon vibratory motion of the bowl in the reverse direction. Also this type of cover prevents splashing of the liquid out of the container at the rate of vibration at which the container operates. The perforations or holes 66a, 67a, 68a, 69a, 70a, 71a, 72a, 73a, 74a and 75a serve as breather openings for the pumping of air at the high frequency of operation of the vibratory bowl.

Figure 12:
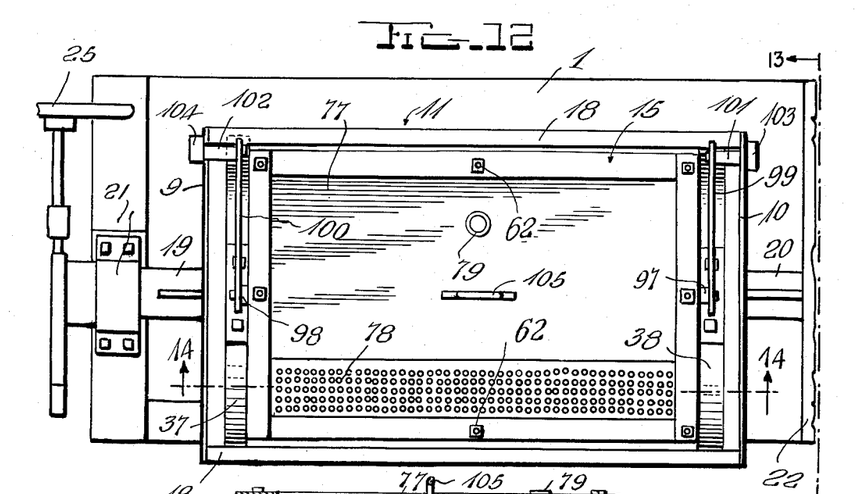
FIG. 12 is a partial top plan view of a modified form of my vibratory machine also showing the construction of a rinse cover attached to the bowl.
Figures 13, 14:
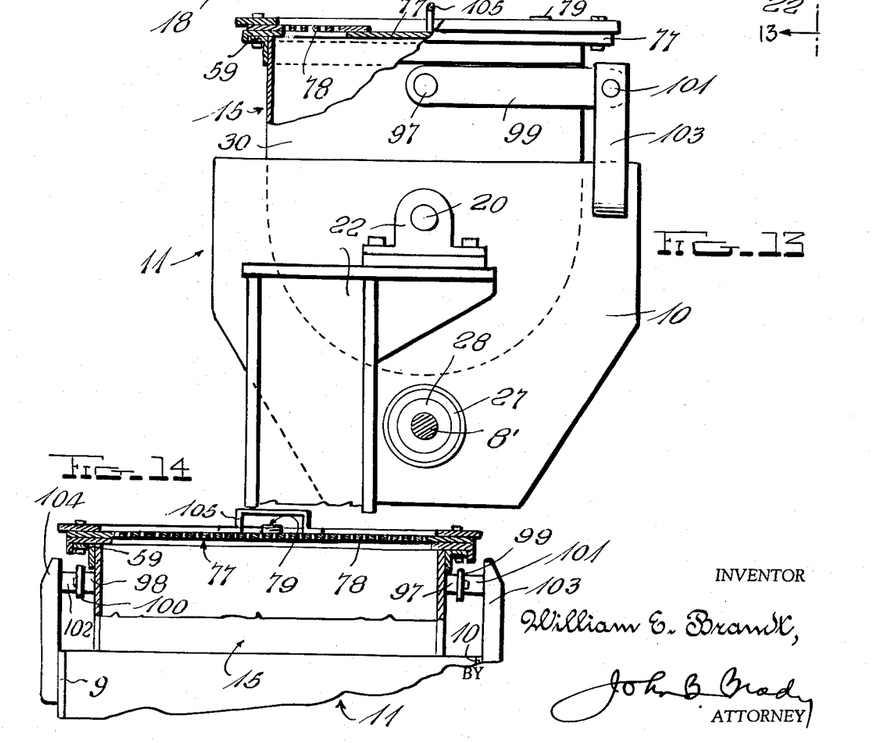
FIG. 13 is a partial end elevational view partly in cut away section of the modified form of my invention taken substantially along line 13—13 of FIG. 12 and showing particularly the link arm coupling between the top of the bowl and the cradle.
FIG. 14 is a vertical sectional view taken substantially along line 14—14 of FIG. 12.

Regardless as to the type of cover used in any previous operation, even if no cover was necessary, and irrespective of the merits and availability of the drainage arrangement previously described, nevertheless, if a subsequent cycle requires neutralizing or rinsing or otherwise cleaning of the bowl or mere cleaning of the media, this may be effectively and advantageously done by use of a rinse cover 77 such as shown in FIGS. 12, 13 and 14. Rinse cover 77 is fastened to flange 59 of bowl 15 in the same manner as duct or pump tube cover 58 is fastened to said bowl flange. Rinse cover 77 provides a screened or perforated metal covered longitudinal opening 78 along one side thereof which is positioned, when clamping said cover to said bowl, so as to lie along the side of the bowl toward which the bowl tilts when in the dump position. A hose connection is also provided on rinse cover 77 as shown at 79 for purposes of connecting to the water line to admit rinsing liquid to the bowl or container while the latter is in normal working position or while it is in complete tilt (dumping) position. When water has been admitted while bowl is in normal working position, a very few seconds of vibration suffice to thoroughly rinse or wash the load. The push button control of the tilting mechanism on the models so equipped is employed to quickly bring the bowl or container into complete tilting position so that all liquid suspended waste and rinse water escape through the perforations of the rinse lid completely and in the shortest possible time. While in this tilted position, additional water may be admitted to the bowl through the hose connection in the rinse lid, accomplishing washing, rinsing or mere flushing of the load, if necessary. The cover is provided with a handle 105 or hook by which a crane can engage the cover to lift it for removing it from the bowl or for placing it in position on top of said bowl.

After the rinse cover 77 is secured on the vibratory bowl 15 and rinsing liquid has been admitted thereto under pressure, the cradle and bowl are tilted to the dump position as shown in FIG. 8 so that the rinsing liquid and any small waste material such as small chips washed from the work, can exit through the screen or perforated metal opening 78 adjacent the edge of the bowl. Depending upon the operation being performed the rinsing process may be repeated several times until the rinsing liquid flows clean through the screen 78.

In many processing runs in which the object is to descale, debur, radii formation, stock removal or fine-finishing, the necessary water levels can be kept sufficiently low, so as to prevent any splashing, thus eliminating the need for any kind of lid or cover. The frictional heat built up within the mass is thus readily dissipated as the rotary motion within the bowl or container keeps bringing the contents to the air cooled surface. For some purposes of processing higher water levels are required. This results in more or less severe conditions of splashing. Where high water levels are required, splashing may be prevented completely by use of a closed lid so constructed as to provide substantial dissipation of frictional heat through pumping action in an air-flow system associated with the vibratory bowl or container. When less high water levels are required, a so-called "splash lid" with a large centrally located opening will prevent splashing and serve to dissipate frictional heat through the large central opening.

In FIGS. 15–24 I have illustrated a number of different and modified types of covers to be used on the bowl 15 in place of the pump tube type cover 58 under various conditions and for different processes.

Figures 15, 16:
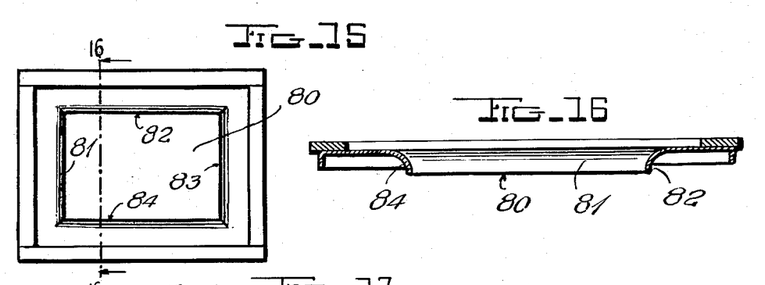
FIG. 15 is a top plan view of a splash cover for the vibratory bowl.
FIG. 16 is a cross-sectional view taken substantially along line 16—16 of FIG. 15.
Figures 17, 18, 19, 20:
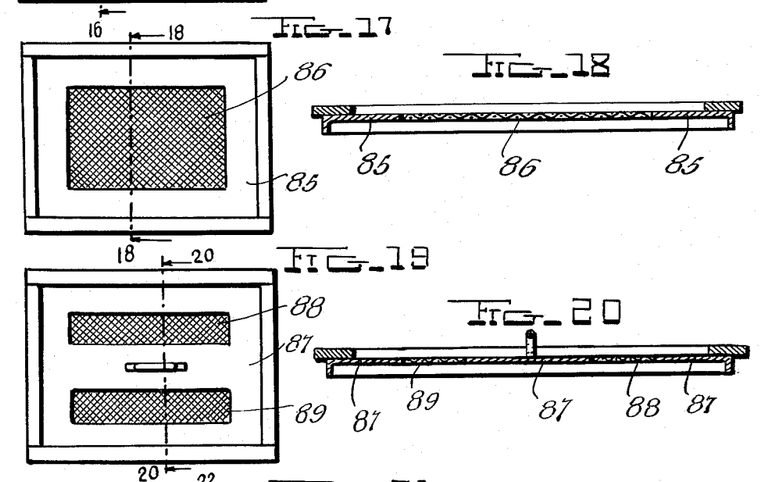
FIG. 17 is a top plan view of a screen cooling cover for the vibratory bowl.
FIG. 18 is a cross-sectional view taken substantially along line 18—18 of FIG. 17.
FIG. 19 is a top view of a modified form of the screen cooling cover shown in FIG. 17.
FIG. 20 is a cross-sectional view taken substantially along line 20—20 of FIG. 19.

In FIGS. 15 and 16 I have illustrated a spash cover in which a large open area shown at 80 is provided in the center portion thereof. The edges of the open area are downwardly curved as shown at 81, 82, 83 and 84 and are spaced sufficiently far from the edge of the bowl so that any liquid splashing up the sides of the bowl will be caught by and turned back into the bowl by these downwardly curved edges. When the splash cover is used the large open area will cool the mass in the bowl sufficiently, so as to make unnecessary the use of the pumping arrangement of the pump tube type cover previously described, either in cutting, coloring or any other operations. However this cover need be used only if the water level employed in the operation is sufficiently high to cause splashing, that is to say, if water level employed in the particular operation is suitable for or demands this cover arrangement.

In FIGS. 17, 18, 19 and 20 I have shown various covers. The entire center portion of cover 85 is covered by a screen or perforated metal covering designated at 86 while in FIGS. 19 and 20 cover 87 contains two screened or perforated metal covered openings designated at 88 and 89 one being disposed along each longitudinal side thereof. The mass within the bowl is cooled, when using either of the above covers, by air circulating through the opening or openings, which circulation is aided by the motion of the bowl. On both of the above covers the edges of the screened areas are set in from the edges of the bowl, where most of the splashing occurs, so that there is no possibility of liquid splashing through the openings if the cover is used with a liquid level not exceeding the allowable liquid level in the bowl designated for these particular covers.

FIGS. 21, 22, 23 and 24 illustrate modified forms of the pump tube or duct type cooling cover discussed earlier. In both of these forms only one set of U-shaped ducts is employed and these ducts function in the same manner as previously set forth but upon vibratory motion of the bowl in either direction.

Figures 21, 22, 23, 24:
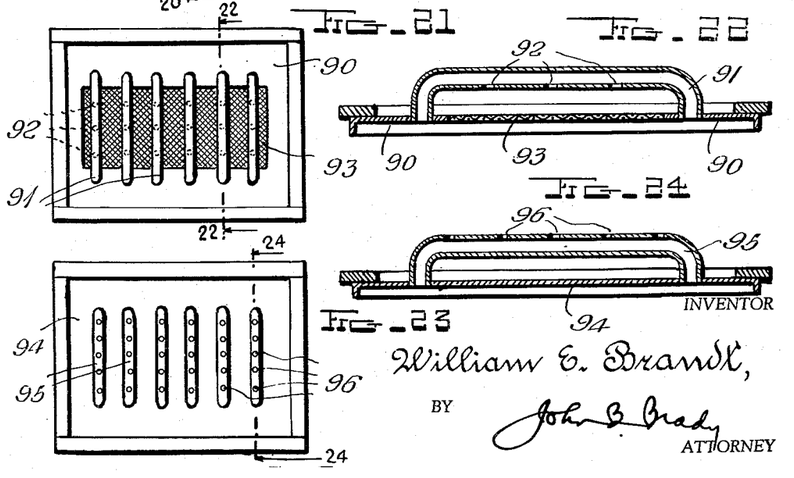
FIG. 21 is a top plan view of a combination screen and duct system cooling cover for the vibratory bowl where the breather apertures in the duct system are located on the lower side of the individual ducts of the duct system.
FIG. 22 is a cross-sectional view taken substantially along line 22—22 of FIG. 21.
FIG. 23 is a top plan view of a modified form of duct or pump tube cooling cover for the vibratory bowl.
FIG. 24 is a cross-sectional view taken substantially along line 24—24 of FIG. 23.

In FIGS. 21 and 22 the cover shown at 90 carries U-shaped ducts indicated at 91 containing perforations, slots, or holes on the underside thereof as indicated at 92 downwardly directed into a screened opening 93 disposed longitudinally beneath ducts 91. This combination of duct and screen type covers can be used with fairly high liquid levels in the bowl since the edges of the screened area are set back relatively far from the edges of the bowl. When the bowl is in operation, cooling air enters the bowl through the screened area 93 and the pumping action of the ducts 91 direct air streams by means of holes 92 down into the bowl through the screened area 93. Thus these air streams act as blowers and circulate the air in the bowl more rapidly thus dissipating the heat through the screened area 93.

In FIGS. 23 and 24 the cover shown at 94 carrying ducts or pump tubes 95, containing holes 96 on the top surface thereof operates basically the same as the duct cover shown at 58. When the bowl is subjected to vibratory motion an air pumping action is established in the ducts thus dissipating hot air and taking in cool air through holes 96 in the ducts.

The pump tube or duct type cover is used mainly where the liquid level in the bowl is very high such as in some burnishing or coloring operations. This type of cover or a modification thereof is also necessary during longer cutting operations in which higher water levels may be necessary. For many cutting operations, especially when they are short as far as time cycles are concerned, no lid at all is necessary since less liquid is used than is required to cause splashing violent enough for any of the liquid to escape the bowl.

I have shown a modified form of my invention in FIGS. 12, 13 and 14 wherein the top of the bowl is coupled to the cradle through links which are pivotally connected to stub-shafts on opposite ends of the bowl to obtain a more subdued path of movement of the bowl. In this form of my invention the bottom of bowl 15 is also supported in cradle 11 by the coil spring and leaf spring suspension system previously described, but it is also coupled to the cradle at the top portion thereof. The upper extremity of the bowl is stabilized by means of stub shafts 97 and 98 projecting from opposite ends of bowl 15 in symmetrical positions immediately below the top flange 59. The stub shafts 97 and 98 are connected through link bars 99 and 100 with pivots 101 and 102 on the upper ends of the vertically extending bars 103 and 104 attached to the cradle 11. The vertically disposed bar 103 is connected to the end 10 of the cradle while vertically disposed bar 104 is connected to the end 9 of the cradle. The link bars 99 and 100 hold the bowl 15 in an upright position but allow the top of the bowl to move in an arc. This arc results in practically vertical motion but its radius is the length of the link bars and its travel is the throw of the eccentrics 12 and 14 on the bottom shaft 8. Therefore, it can be seen that the link arms in this modified form substantially eliminate the horizontal movement component from the top portion of the bowl 15 so that the motion in the top portion of the bowl is substantially an up and down movement. Since the link bars operate on two pivots some slight horizontal motion is combined with the up and down motion. The motion in the bottom portion of the bowl is the same substantially rotary motion as set forth in the principal form of my invention. Thus by substantially removing the horizontal movement component from the top portion of the bowl a more refined movement is obtained and finer control is obtained over the vibratory motion of the bowl which is a desired feature when finishing certain parts or performing certain operations. It is conceded, however, that the guide link bars here described act as a bridge for transmitting vibration to the framework of the machine and to the foundation or ground. This modification of the machine is, therefore, less desirable than those models in which the bowl or container is "free floating" without the link bars.

I have found the equipment of my invention as herein set forth highly practical in its construction and operation and while I have described my invention in certain preferred embodiments I realize that modifications may be made and I desire that it be understood that no limitations upon my invention are intended other than may be imposed by the scope of the appended claims.

What I claim as new and desire to secure by Letters Patent of the United States is as follows:

1. In a vibratory machine, a frame structure, a container for material and media, means for mounting said container within said frame structure for vibratory movement with respect to the frame structure for imparting movement to the material and media in said container, an eccentrically journaled rotary weight suspended from said container for vibrating said container about a horizontally disposed axis when rotatively driven and means external to said frame structure for imparting a rotary driving force to said eccentrically journaled rotary weight whereby the rotation of said weight imparts vibratory movement to said container for imparting movement to the material and media therein.

2. A vibratory machine as claimed in claim 1 which includes a drive shaft operatively connected to the eccentrically journaled rotary weight and means coupling the drive shaft to said means external of the frame structure for imparting rotary driving force to said eccentrically journaled rotary weight.

3. A vibratory machine as claimed in claim 2 in which the means for coupling the drive shaft to the rotary drive means comprises a flexible member extending through one of the end walls of the cradle in a position beneath the bottom of the container.

4. A vibratory machine as claimed in claim 2 in which the means for coupling the drive shaft to the rotary drive means comprises a flexible hollow tubular member for substantially absorbing transmission of vibratory motion from said drive shaft to said rotary drive means and wherein said flexible hollow tubular member extends through one of the end walls of said container in a position beneath the bottom of the container.

5. A vibratory machine as claimed in claim 2 in which the drive shaft is journalled on the container and carries a plurality of linearly extending eccentrics which produce vibratory motion upon rotation and imparts same to the container in a direction transverse to the longitudinal axis of the container in both the upper and lower portions thereof.

6. A vibratory machine as claimed in claim 2 in which the drive shaft extends beneath the bottom of the container and is journalled with respect to opposite aligned ends of the container in positions beneath the bottom of the container and wherein said shaft contains eccentric weights intermediate said journals which are rotatable with the shaft for imparting vibratory movement to the container through said shaft and journal supports.

7. In a vibratory machine, a frame structure, a container, means for mounting said container within said frame structure for vibratory movement with respect to said frame structure, an eccentrically journaled rotary weight suspended beneath the bottom of said container for vibrating said container for rotational movement about a substantially horizontally disposed axis when rotatively driven, means carried by one end of said container for rotatively driving said rotary weight, and means on the opposite end of said container for stabilizing the position of the container within said frame structure, said rotated weights operating to impart a rotary driving force to said eccentrically journaled rotary weight whereby the rotation of said weight imparts vibratory movement to said container.

8. A vibratory machine comprising a frame, a peripheral cradle journaled for arcuate movement between upright and tilted position within said frame, a container having a top opening for receiving and discharging treatment material and media, means for resiliently suspending said container or said cradle for relative bi-directional vibratory movement in a direction transverse to the axis of the journaled cradle including spring tension means connecting opposite sides of said container with said cradle, means carried by said container for subjecting said container to vibration about an axis transverse of the axis of the journalled cradle while restricting the amplitude of movements thereof and means for driving aforesaid means.

9. A vibratory machine as claimed in claim 8 which includes journal means interconnecting the frame and the cradle for mounting the cradle with the container resiliently supported thereby for rocking movement relative to the frame between an upright position of use and a tilted position for unloading.

10. A vibratory machine as claimed in claim 8 in which the means mounting the cradle for arcuate movement within said frame comprises trunnions carried by opposite ends of said frame and in which the cradle is journaled at opposite ends on said trunnions.

11. A vibratory machine as claimed in claim 10 which includes means for orienting the cradle about the trunnions for moving the container to positions for charging and discharging the contents thereof.

12. A vibratory machine as claimed in claim 8 which includes means on the bottom side of the container for the discharge of fluid from the container.

13. A vibratory machine comprising a frame, a peripheral cradle journalled for arcuate movement between an upright and tilted position within said frame, a container having a top opening for receiving and discharging treatment material and media, means for resiliently suspending said container on said cradle for relative bidirectional vibratory movement in a direction transverse to the axis of the journalled cradle including tension means connecting opposite sides of said container with said cradle, means carried by said container for subjecting said container to vibration about an axis transverse to the axis of the journalled cradle while restricting the amplitude of movements thereof, and means for driving said aforesaid means and in which the means resiliently suspending the container on the cradle comprises a symmetrical composite arrangement of elliptical transversely extending leaf springs and coacting vertically extending coil springs.

14. A vibratory machine comprising a frame, a peripheral cradle journalled for arcuate movement between an upright and tilted position within said frame, a container having a top opening for receiving and discharging treatment material and media, means for resiliently suspending said container on said cradle for relative bidirectional vibratory movement in a direction transverse to the axis of the journalled cradle including tension means connecting opposite sides of said container with said cradle, means carried by said container for subjecting said container to vibration about an axis transverse to the axis of the journalled cradle while restricting the amplitude of movements thereof, and means for driving said aforesaid means and in which the means resiliently suspending the container on the cradle comprises leaf springs connected between the lower portions of opposite ends of said container and the bottom portion of said cradle and exteriorly of the end walls of said container and adjacent a pair of coil springs symmetrically mounted between the lower portion of either side of said container in the vicinity of each end portion thereof and the bottom portion of said cradle.

15. A vibratory machine comprising a frame, a peripheral cradle journalled for arcuate movement between an upright and tilted position within said frame, a container having a top opening for receiving and discharging treatment material and media, means for resiliently suspending said container on said cradle for relative bidirectional vibratory movement in a direction transverse to the axis of the journalled cradle including tension means connecting opposite sides of said container with said cradle, means carried by said container for subjecting said container to vibration about an axis transverse to the axis of the journalled cradle while restricting the amplitude of movements thereof, and means for driving said aforesaid means and in which the tension means connecting the opposite sides of the container with the cradle comprises a symmetrical composite arrangement of leaf springs and coil springs connecting the lower portions of said container with the lower portions of said cradle and pivot link bars interconnecting the upper portions of opposite ends of said container with the upper portions of the corresponding ends of the cradle.

16. A vibratory machine comprising a frame, a peripheral cradle journalled for arcuate movement between an upright and tilted position within said frame, a container having a top opening for receiving and discharging treatment material and media, means for resiliently suspending said container on said cradle for relative bidirectional vibratory movement in a direction transverse to the axis of the journalled cradle including tension means connecting opposite sides of said container with said cradle, means carried by said container for subjecting said container to vibration about an axis transverse to the axis of the journalled cradle while restricting the amplitude of movements thereof, and means for driving said aforesaid means and in which the means suspending the container on the cradle comprises a leaf spring connected between the lower portion of either end of said container and the bottom portion of said cradle, exteriorly adjacent a pair of coil springs symmetrically mounted between the lower portion of either side of said container in the vicinity of each end portion thereof and the bottom portion of said cradle, and link bars disposed at each end of said container connecting the upper portion of said container with said cradle, the link bars being pivotally connected on one end thereof with the container and on the other end thereof with the cradle, both of said connections being located substantially above the plane of the top of said cradle.

17. A vibratory machine comprising a frame, a peripheral cradle journalled for arcuate movement between an upright and tilted position within said frame, a container having a top opening for receiving and discharging treatment material and media, means for resiliently suspending said container on said cradle for relative bidirectional vibratory movement in a direction transverse to the axis of the journalled cradle including tension means connecting opposite sides of said container with said cradle, means carried by said container for subjecting said container to vibration about an axis transverse to the axis of the journalled cradle while restricting the amplitude of movements thereof, and means for driving said aforesaid means, and in which the means carried by the container for subjecting the container to vibration consists of cylindrical eccentrics located on the bottom side of the container and means for rotation of said eccentrics.

References Cited in the file of this patent

UNITED STATES PATENTS

| | | |
|---|---|---|
| 723,180 | Porter | Mar. 17, 1903 |
| 2,200,724 | Robins | May 14, 1940 |
| 2,284,671 | Meinzer | June 2, 1942 |
| 2,391,634 | Lewis | Dec. 25, 1945 |
| 2,469,484 | Thiman | May 10, 1949 |
| 2,585,838 | Ransohoff | Feb. 12, 1952 |
| 2,613,036 | Robinson | Oct. 7, 1952 |
| 2,722,840 | Kececioglu | Nov. 8, 1955 |
| 2,727,316 | Naselli | Dec. 20, 1955 |
| 2,757,544 | Becker | Aug. 7, 1956 |
| 2,809,473 | Heaphy | Oct. 15, 1957 |
| 2,840,923 | Behrens | July 1, 1958 |
| 2,875,989 | Toulmin | Mar. 3, 1959 |
| 2,882,024 | Behrens | Apr. 14, 1959 |
| 2,918,926 | Behnke | Dec. 29, 1959 |